UNITED STATES PATENT OFFICE.

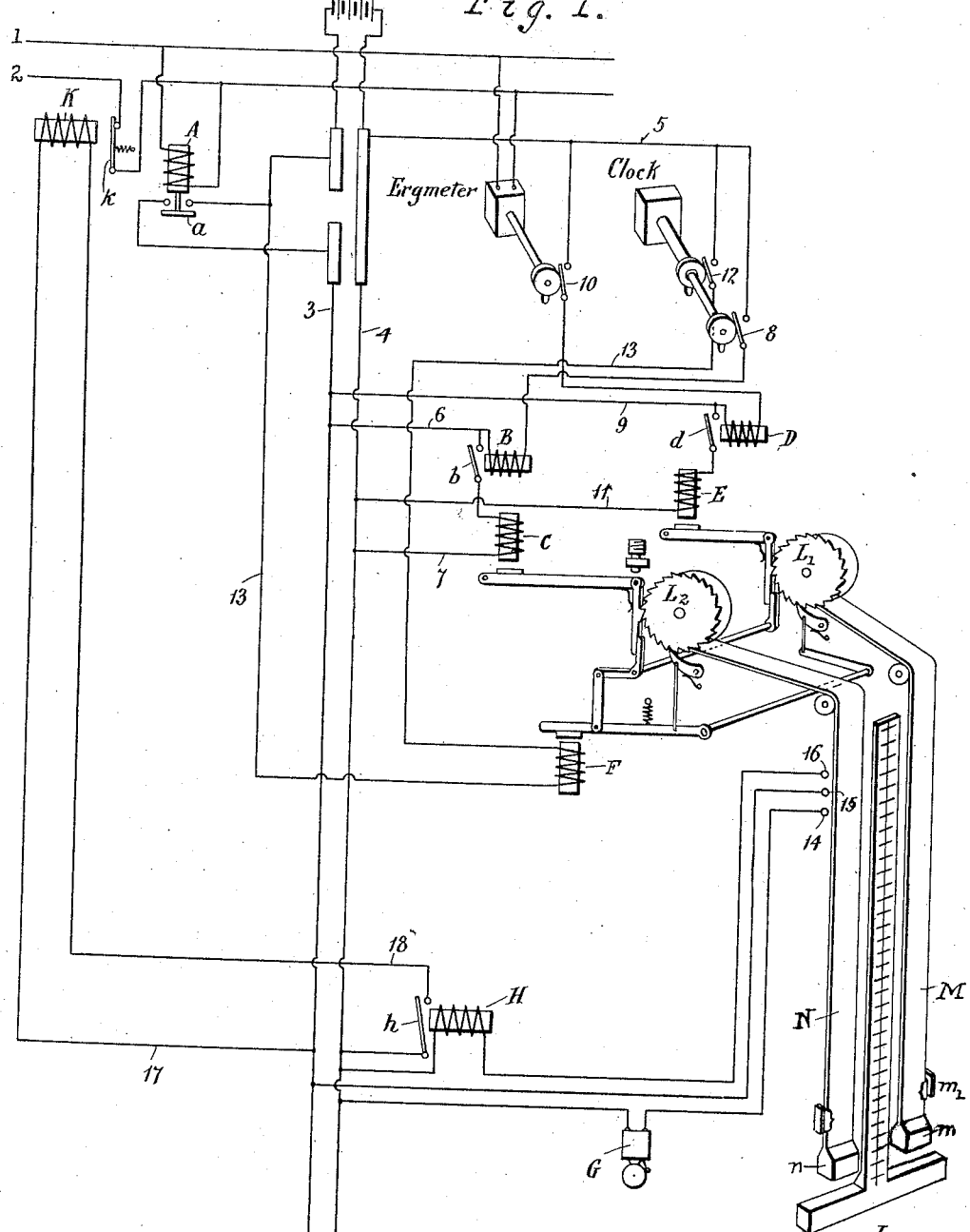

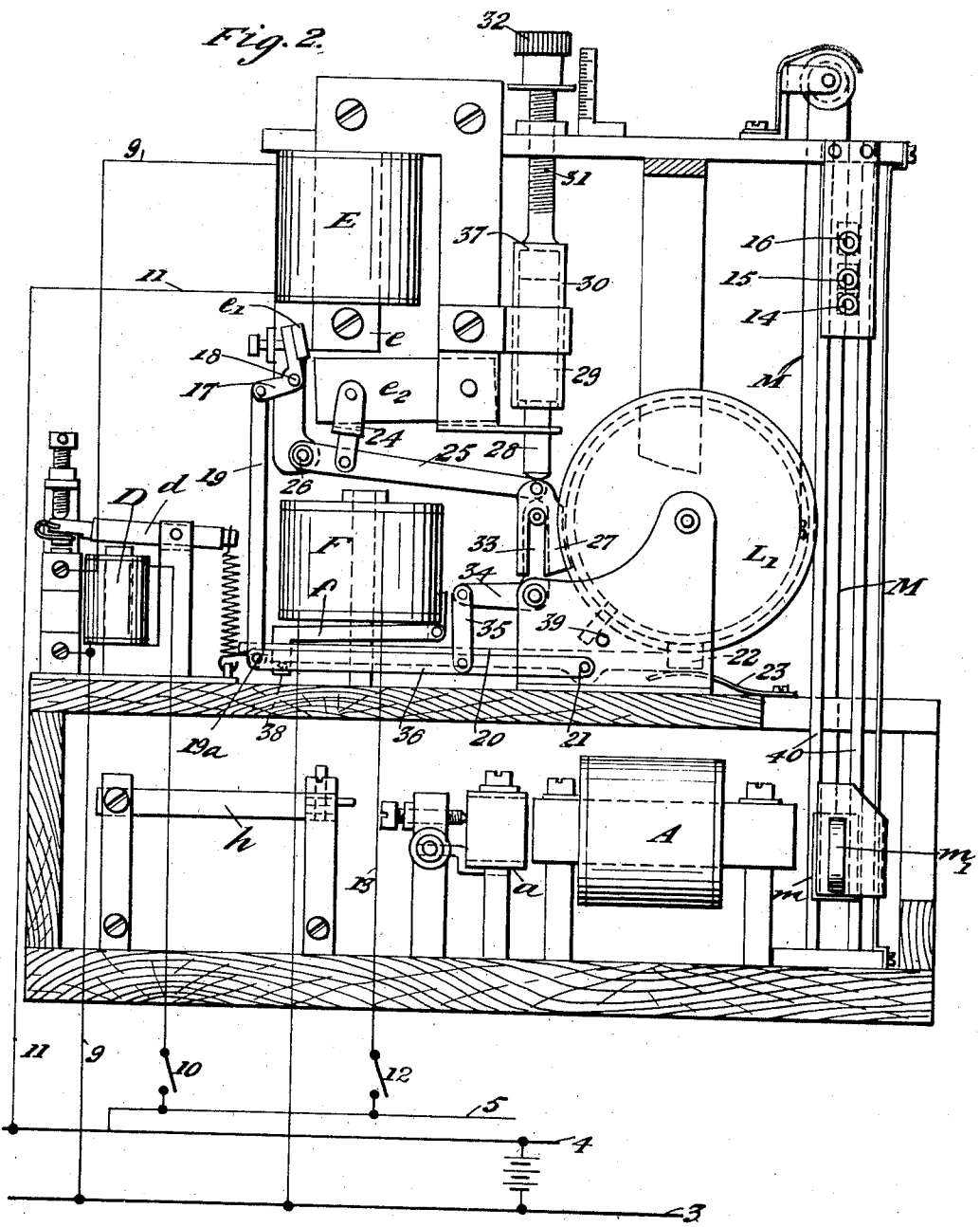

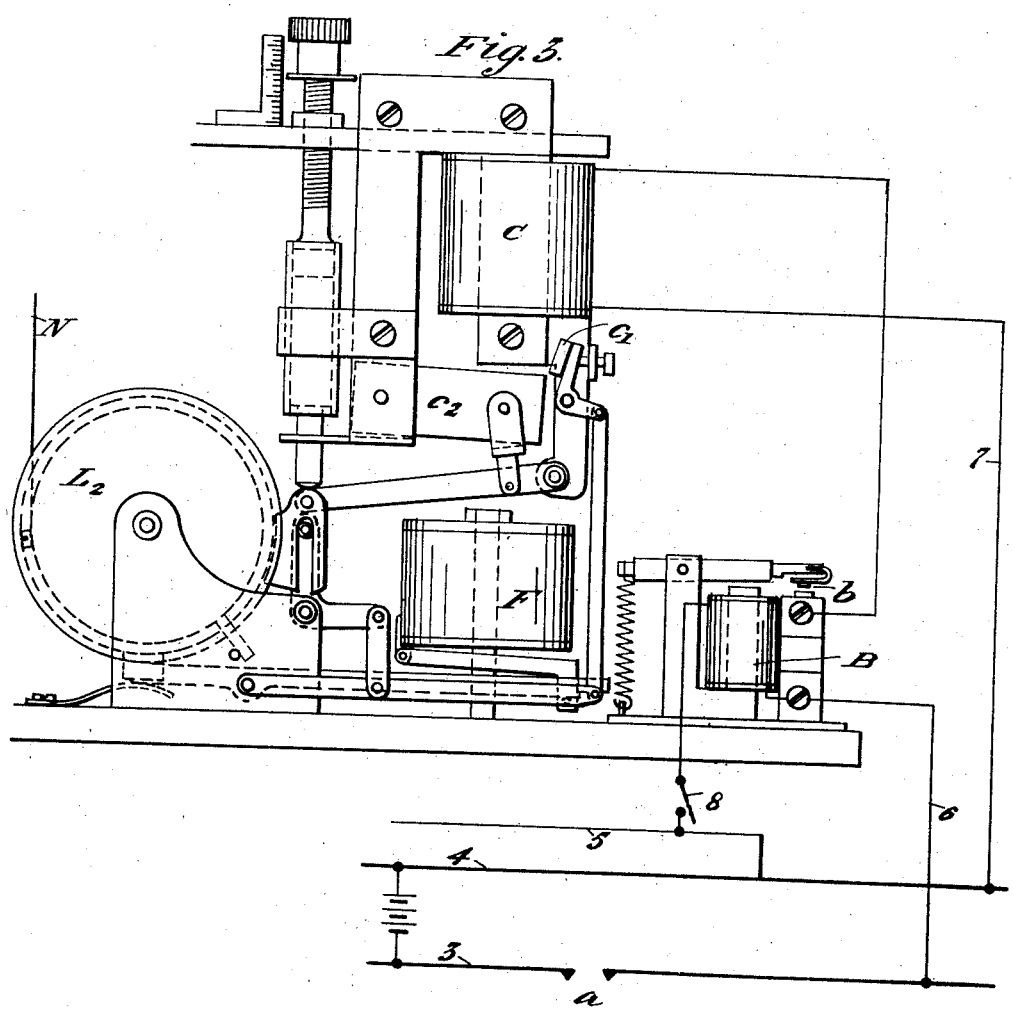

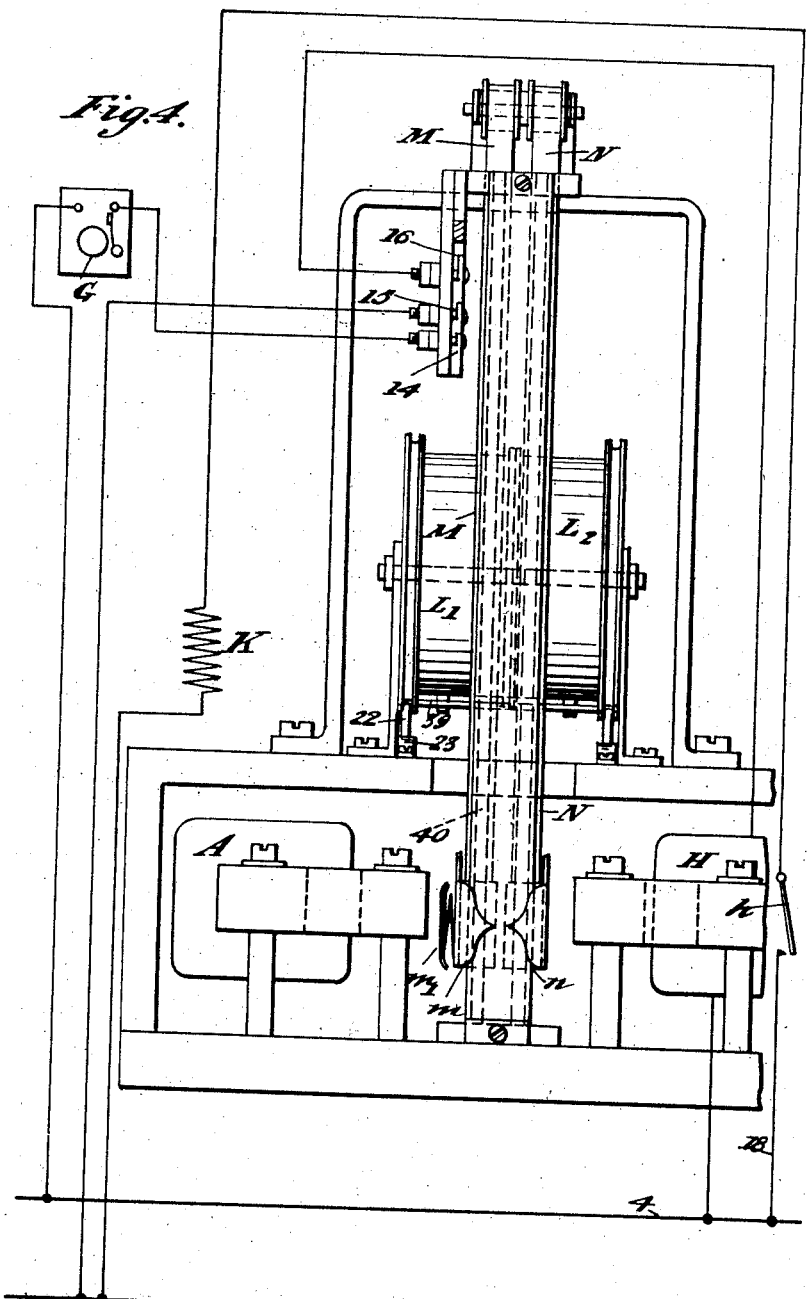

COLIN C. GOW, OF LONDON, ENGLAND.

MAXIMUM-DEMAND CONTROLLER AND LOAD-INDICATOR FOR ELECTRIC-POWER INSTALLATIONS.

1,314,471.  Specification of Letters Patent.  Patented Aug. 26, 1919.

Application filed November 30, 1918. Serial No. 264,856.

*To all whom it may concern:*

Be it known that I, COLIN CLARENCE GOW, a subject of the King of Great Britain, residing in London, England, have invented certain new and useful Improvements in Maximum-Demand Controllers and Load-Indicators for Electric-Power Installations, of which the following is a specification.

In industrial installations using electric energy it is often important that the average demand for power during a given interval of time should not exceed a fixed maximum value. If this maximum demand is exceeded at any time, the given interval on the one hand the safety of the working plant may be endangered, and on the other hand considerable needless expense may be incurred if the installation is supplied with power from a central station and the charge depends, as it usually does, not only on the energy used but also on the maximum demand for power (averaged over an agreed interval of time, which may be, for example, half an hour) during the current term.

It is obvious that the most efficient and most economical working of the installation occurs when the load factor is unity and when the power demand always approximates to but never exceeds the maximum permissible value. If, on the other hand, the average load during the given interval on any one occasion largely exceeds that at any other time, the loss may be very serious.

In electrically operated industries in which the power varies considerably and perhaps fluctuates rapidly, it is impossible to maintain the average demand at the required values by observation of an indicating or recording wattmeter.

According to the present invention, an instrument is provided for operating an electrical plant which shows the rate at which the energy is being consumed at any time and whether that rate is more or less than a predetermined value, and in the former case gives a warning by a bell, or other suitable means, toward the close of the given interval of time, and if the warning is not heeded, automatically stops the supply when the maximum agreed demand of energy has been supplied and prevents any further supply being taken until the period over which the average maximum demand is measured has expired, i. e., until the instrument is re-set.

According to the invention also the instrument is automatically re-set at the end of every time interval whether the load is on or off but, apart from this re-setting action, the current supply to the instrument is cut off whenever the load is taken off.

The time intervals at which the instrument is re-set must synchronize with the time intervals determined by the timing device of the power company supplying the electric energy.

In a construction according to the invention, two tapes or cords of suitable flexibility are wound intermittently at frequent intervals of time on to drums side by side; the one tape is actuated by a clock so that its motion is at a constant rate, and the other by an ergmeter, which moves the tape through a constant distance whenever a given amount of energy has been expended.

A convenient method of insuring that the tape actuated by the ergmeter moves through the same distance at each advance consists in an electromagnetic device, by which a plunger is actuated through a constant distance whenever the coil is energized by the ergmeter, this distance, however, being capable of regulation. For this purpose, as the plunger is moved in one direction the drum actuating the power recording tape is advanced by a clutch device through a distance corresponding to the stroke of the plunger. For a given setting of the stop the tape will advance by the same amount whenever the ergmeter has recorded a given quantity of energy, but the value of this constant advance can be varied as required according to the load at which it is desired to maintain the working plant. The time-operated tape is actuated by a similar device. The relative advance of the two tapes shows at any moment the actual consumption of energy during the interval as compared with the amount for which the instrument has been set.

The drums upon which the tapes are wound are automatically re-set when the time-operated tape has completed a given advance, that is, at the end of the given time interval over which the demand is averaged.

Should the tape operated by the ergmeter advance too rapidly and reach a certain point prior to the re-setting action, a bell or other signal is operated and, when the erg-meter actuated tape has further advanced to a position corresponding to the maximum average demand set, a trip coil is energized which automatically cuts off the supply of energy.

In the accompanying drawings Figure 1 shows diagrammatically the general arrangement of the circuits and actuating apparatus of an instrument according to the invention. Fig. 2 is a front elevation of an example of an instrument according to the invention. Figs. 3 and 4 are respectively a back and side elevation of the instrument.

Referring to Fig. 1, A is a coil connected with leads 1 and 2 of a low tension single or polyphase alternating current supply and is energized so long as those leads are "live". The coil A, when energized, closes a switch $a$ which connects leads 3 and 4 with a direct current source of supply; from the leads 3 and 4 circuits are taken to the various parts of the apparatus. A relay coil B is inserted in a circuit branched from the leads 3 and 4 over conductors 5 and 6 and is energized from a clock over a contact 8 at regular intervals of time, for example every half minute. Relay B, when energized, closes its contact $b$ and thereby energizes over leads 6 and 7 an electromagnet C which rotates a winding drum carrying a vertical tape through a given angular step at each contact.

D is a relay connected with the leads 3 and 4, over leads 5 and 9, which is energized over a contact 10 whenever the integrating wattmeter records the consumption of a predetermined unit of electric energy. Relay D, by closing its contact $d$, energizes over leads 9 and 11 an electromagnet E which rotates a winding drum carrying a vertical tape through a given angular step at each contact. The tapes operated by the two drums are ranged side by side and carry indices which are easily seen by the workmen operating the power units of the installation.

F is an electromagnet re-setting the winding drums energized over leads 5 and 13 when a contact 12 is closed by the clock. This contact is closed at the expiration of each interval of time over which the average maximum demand is integrated.

If during this time interval the tape operated by the power drum has reached nearly to the upper limit of its travel, contacts 14 and 15 are closed which cause a warning bell G to ring, or some other suitable signal to be operated. At the end of the travel of the power-driven tape contacts 15 and 16 are closed which energizes a relay H. The relay H, when energized, closes over leads 17 and 18 the circuit of a trip coil K, which in known manner opens the switch K and cuts off the supply of power and renders the leads 1 and 2 "dead."

Similar parts are denoted by the same reference characters in Figs. 2—4 as in Fig. 1.

When the magnet E is energized by the action of relay D its armatures $e_1$ and $e_2$ are attracted to the iron core $e$. The armature $e_1$ is secured to a bent lever 17 pivoted at 18; the lever 17 is connected by a link 19 at the lower end of which is a pin $19_a$ in contact with a brake lever 20 which is pivoted at 21 and carries at one end a brake 22 normally held by a spring 23 against the rim of a drum $L_1$ on which a tape M is wound.

When the armature is attracted it rotates the bent lever 17 so as to remove the brake from the winding drum $L_1$; the armature $e_2$, which is adapted to move with a momentary delay behind the armature $e_1$, is connected by a stirrup piece 24 with a lever 25 pivoted at 26. The free end of the lever carries a clutch 27 engaging with the drum $L_1$ and in contact with the upper surface of the free end of the lever 25 is a plunger rod 28 of a plunger 29 sliding in a vertical cylinder 30. The plunger and rod are raised whenever the armature $e_2$ is attracted to the core $e$ of the magnet E until the plunger 29 meets the end of the cylinder 30; the position of the cylinder, and with it the length of the stroke of the plunger, can be adjusted by the screw 31 operated by the milled head 32.

For the same setting of the screw the stroke of the plunger and the angular rotation of the drum $L_1$ is constant at every attraction of the armature $e_2$, which occurs whenever the switch 10 is closed by the integrating wattmeter whenever a predetermined unit of energy has been supplied to the installation.

On the release of the armature $d$ of the relay D, magnet E is deënergized and the armature $e_2$ and the plunger 29 fall by gravity and return the lever 25 and with it the clutch 27 to its normal position in which it is supported by an arm 33 of an angular lever 33—34.

The lever 33, 34 is connected by a link 35 with a lever 36 pivoted on the hinge 21 and operated by the armature $e_1$. The connection between the clutch 27 and the arm 33 of the angular lever 33, 34 is such that when the armature $e_1$ is attracted the clutch is forced into engagement with the drum $L_1$, and when the armature is released the clutch is disengaged.

The movements of the plunger 29 are damped by the time required for the air between the plunger and the head of the cylinder 30 to pass through a small hole 37 provided in the cylinder head.

The electromagnet F is energized as described above when the switch 12 is closed by the clock at the expiration of each interval of time over which the maximum demand is to be integrated and attracts its armature $f$ and by a pin 38 on the armature coöperating with the brake lever 20 releases the brake 22 and allows the drum $L_1$ to return to its normal setting against a stop 39 on the action of a weight $m$ carried by the tape M. The weight $m$ is guided vertically on rods 40. To the weight $m$ a spring contact $m_1$ (Fig. 4) is secured adapted to connect the contacts 14 and 15 and ring the bell G when the tape has traversed a certain distance and also to connect contacts 15 and 16 which complete the circuit of the relay H when the full permissible travel of the tape M has been completed. The relay H when energized closes the switch $h$ and, as explained above, completes the circuit of the trip coil K which may be suitably mounted to mechanically trip the main supply switch, rendering leads 1 and 2 "dead". Switch $a$ then opens and prevents any further action of the instrument excepting the operation of the re-setting magnet F.

The electromagnet C (Fig. 3) is energized over the contacts of the armature $b$ of the relay B when the switch 8 is closed by the clock. The armatures $c_1$, $c_2$ are arranged similarly to the armatures $e_1$, $e_2$ of the magnet B and the operations of clutching, braking and re-setting the winding drum $L_2$ are similar to those described above in connection with the drum $L_1$.

The tape N is loaded with a weight $n$ and the relative positions of indices attached to the weights $m$ and $n$ show at any time whether energy is being supplied to the installation at a rate corresponding to below or above the maximum average demand during the prescribed interval of time.

Having thus described the nature of the said invention and the best means I know of carrying the same into practical effect, I claim:

1. A maximum demand controller and load indicator for an electric power installation comprising, in combination, a clock, an ergmeter, and two indicators, one operated by the clock at a constant rate, and the other by the ergmeter at a rate proportional to the energy supplied to the installation throughout the given time interval over which the maximum demand is averaged, and means for automatically re-setting the indicators at the termination of each of the said intervals.

2. A maximum demand controller and load indicator for an electric power installation comprising in combination two adjacently disposed drums and flexible members wound respectively on said drums, a clock and an ergmeter, one of the said drums being actuated intermittently by the clock at a constant rate and the other drum being actuated by the ergmeter through a constant angular distance whenever a given amount of energy, as measured by the ergmeter, has been supplied to the installation.

3. A maximum demand controller and load indicator for an electric power installation, comprising in combination two adjacently disposed drums and bands wound respecively on said drums, a clock and an ergmeter, one of the said drums being actuated intermittently by the clock at a constant rate and the other drum being actuated by the ergmeter through a constant angular distance whenever a given amount of energy, as measured by the ergmeter, has been supplied to the installation, and indicators attached to the said bands showing the relative advance of the bands during the given interval of time.

4. A maximum demand controller and load indicator for an electric power installation, comprising in combination two drums and flexible members wound respectively on said drums, electromagnetic devices and plungers operated thereby adapted to rotate the said drums through constant but regulable amounts at each energization of the said electromagnetic device, a clock and an ergmeter, one of the said devices being energized whenever a given amount of energy has been supplied to the ergmeter and the other of the said devices being energized at constant time intervals.

5. A maximum demand controller and load indicator for an electric power installation, comprising in combination two drums and flexible members wound respectively on said drums, electromagnetic devices and armatures operated thereby, brakes and clutches for said drums connected to said armatures, cylinders, plungers operating in said cylinders and connected to said armatures, the stroke of the plungers determining the amount of angular advance of the drums when said electromagnetic devices are energized and flexible members wound on said drum and adapted by their relative movement to indicate whether the rate at which energy is being supplied to the installation is more or less than a predetermined value.

6. A maximum demand controller and load indicator for an electric power installation, comprising in combination two drums and flexible members wound respectively on said drums, electromagnetic devices and armatures operated thereby, brakes and clutches for said drums connected to said armatures, cylinders adjustable in the direction of their axes, plungers operating in said cylinders and connected to said armatures, the stroke of the plungers being controlled by the axial position of the cylinders and determining the amount of angular advance of the drums when said electromagnetic devices are energized and flexible members wound on said drum and adapted by their relative movement to indicate whether the rate at which energy is being supplied to the installation is more or less than a predetermined value.

7. A maximum demand controller and load indicator for an electric power installation comprising in combination a source of direct current electricity and a circuit connected thereto, a clock and a switch in the said circuit closed at regular intervals of time by the clock, a relay energized when said switch is closed, an electromagnet energized by said relay, a rotatable drum, a flexible member wound on the drum and advanced through a given distance when said electromagnet is energized, an ergmeter, and a second switch in a circuit connected to the direct current source and closed when a predetermined amount of electric energy has been supplied to the said ergmeter, a relay energized when the last mentioned switch is closed and adapted to close the circuit of a second electromagnet, and a second rotatable drum and flexible member advanced through a given distance when said second electromagnet is energized.

8. A maximum demand controller and load indicator for an electric power installation comprising in combination a source of direct current electricity, a clock and an ergmeter and circuits respectively connecting the clock and ergmeter with the said source, switches in the said circuits, relays energized when said switches are closed, means operated by the relays for rotating drums carrying flexible members, a switch closed by the clock at the termination of each interval of time during which the average demand is averaged and a relay energized when the said switch is closed and adapted to re-set the drums to their original angular positions.

In testimony whereof I have signed my name to this specification.

COLIN C. GOW.